Oct. 7, 1941.   D. HOPPENSTAND   2,257,959

FASTENER WITH LOCK WASHER ATTACHED

Filed Oct. 26, 1940

INVENTOR
David Hoppenstand
by his atty.
Stebbins and Blenko

Patented Oct. 7, 1941

2,257,959

UNITED STATES PATENT OFFICE 2,257,959

FASTENER WITH LOCK WASHER ATTACHED

David Hoppenstand, Fox Chapel Borough, Pa.

Application October 26, 1940, Serial No. 362,979

2 Claims. (Cl. 151—32)

This invention relates to lock washers and, in particular, to lock washers adapted to be permanently assembled with screws, bolts or other like threaded fasteners, before being shipped out from the factory.

Threaded fasteners such as screws, bolts or the like are now made in large numbers with lock washers prefixed thereto. The devices of this character known heretofore, so far as I am aware, require special features in the design of the fastener to hold the lock washer thereon. In one example, a screw has a shank with a reduced portion adjacent the head and the washer is applied thereto before the threads are rolled in the shank. The increased maximum diameter resulting from the thread-rolling operation holds the washer on the shank. It has also been proposed to form lock washers from long strips by bending flatwise in an arc and connecting the abutting ends, in order to apply washers to screws or the like in the shank of which threads have already been formed.

I have invented a novel lock washer adapted to be assembled with a standard threaded fastener before it leaves the factory by a simple press operation, without the necessity of any special operations in the manufacture of the screw or the washer. As a matter of fact, the washer can be readily applied to standard threaded fasteners already made up. In a preferred embodiment, the lock washer of my invention comprises a disk having a hole therethrough with radial slits spaced circumferentially of the hole. The hole is slightly smaller than the maximum diameter of the shank of the fastener to which it is to be applied. The washer is assembled with the fastener merely by pressing it on the shank. The radial slits provide deformable tongues extending inwardly from the washer which are bent out of their original plane as the washer is forced on the screw and thereby engage the shank with such force as to prevent the removal of the washer therefrom. The washer is also provided with teeth or projections adapted to engage the underside of the head of the fastener when it is screwed home.

The preferred embodiment briefly described above and certain modifications thereof will be explained more fully hereinafter with reference to the accompanying drawing. In the drawing, Fig. 1 is a bottom plan view of a lock washer according to my invention;

Figure 1:
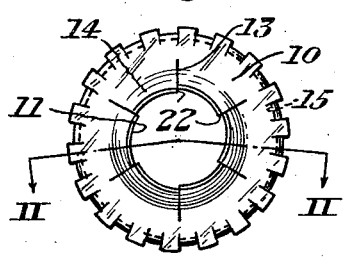
Figure 2:
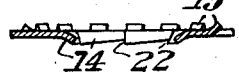
Fig. 2 is a sectional view along the plane of line II—II of Fig. 1.

Referring now in detail to the drawing, the lock washer of my invention comprises a disk 10 composed of suitable material, preferably spring steel, having a central opening 11 therethrough adapted to receive the shank of a threaded fastener such as a machine screw 12. Radial slits 13 extending outwardly from the edge of the opening 11 are spaced circumferentially of the disk 10 and provide a plurality of deformable tongues 14. As shown in Fig. 2, the tongues are preferably dished slightly out of the general plane of the disk 10. In addition, the ends of the tongues 14 are deformed slightly into portions of a helix, as indicated in Figs. 1 and 2.

Figure 3:
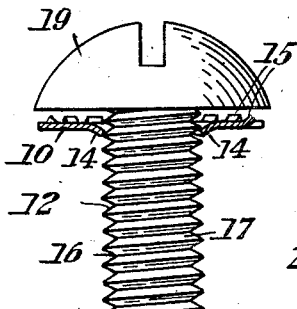
Fig. 3 shows a washer assembled with a standard threaded fastener.

Spaced portions of the outer edge of the disk 10 are bent upwardly from the general plane thereof to provide spaced teeth 15 adapted to engage the underside of the head of a fastener such as the screw 12. The lock washer intended for this screw is so dimensioned that the diameter of the hole 11 after the dishing of the tongues 14 is slightly less than the maximum diameter of the shank of the screw indicated at 16. By reason of this dimensional relation, the washer 10 may easily be pressed onto the shank 16 of the screw, the tongues 14 being deformed to the extent necessary to pass the threads 17. It will be understood that the washer 10 is preferably applied by a straight thrust and not by turning on the screw shank although this mode of application might be employed. Regardless of the method of application, when the washer 10 is in the position illustrated in Fig. 3, the tongues 14 positively prevent withdrawal of the washer from the screw shank.

Figure 4:
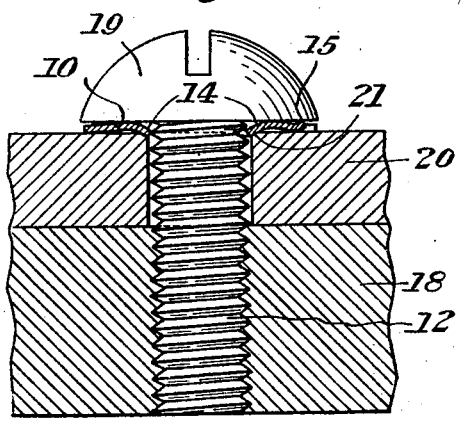
Fig. 4 shows the washer on the fastener after the latter has been screwed home.

When the screw 12 is threaded into a machine part such as illustrated at 18 in Fig. 4, the head 19 of the screw is forced against the upturned teeth 15. The corners of the teeth bite into the head and positively prevent unscrewing thereof against the forces incident to vibration or the like normally experienced in the operation of an ordinary mechanical member such as a machine part. In addition, the dished ends of the tongues 14 actually deform the edge of the hole in the member being secured, shown at 20, through which the screw extends, as indicated at 21, thereby anchoring the washer securely against rotation with the screw. It will be observed that, as shown in Fig. 4, the washer does not flatten out under the pressure exerted by the head 19 of the screw.

Figure 5:
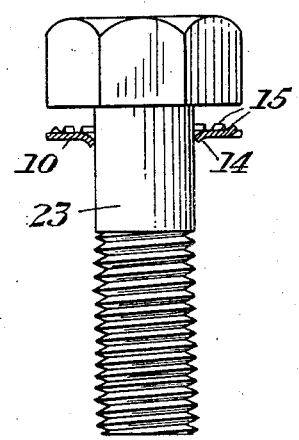
Fig. 5 is a view similar to Fig. 3 showing the washer on a different form of fastener.

The helical shaping of the ends of the tongues 14 provides sharp edges 22 which increase the holding power of the lock washer by biting into the shank of the screw. This is particularly true when the washer is disposed on a fastener having a shank a portion of which is unthreaded, such as the cap screw 23 shown in Fig. 5.

While the washer is intended particularly to be assembled with a fastener before shipment of the latter from the factory, it may also serve satisfactorily when used under a nut, being applied to the shank of the fastener such as a bolt after insertion of the latter through a hole adapted to receive it.

Figure 6:
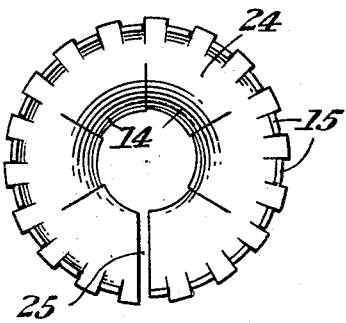
Fig. 6 is a plan view of a slightly modified form of washer.
Figure 7:
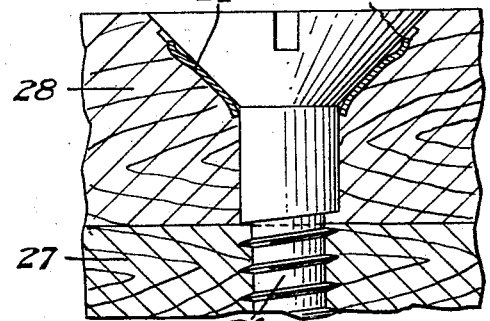
Fig. 7 shows the washer of Fig. 6 on a wood screw which has been turned home.

Fig. 6 illustrates a modified form of lock washer according to my invention, indicated generally at 24. This washer is similar to the washer 10 except that it has a radial slot 25 extending therethrough at one point. This washer is particularly adapted for use on screws with countersunk heads, as illustrated in Fig. 7. For the purpose of illustration, a wood screw 26 is threaded into a member 27 for securing thereto a piece 28. The washer 24 is applied to the shank of the screw 26 in the manner already described. As the screw 26 is turned home, the interior portion of the washer is materially deformed by compression between the head of the screw and the piece 28. The washer is actually embedded in the piece and is held against rotation therein. At the same time, the teeth 15 of the washer bite into the conical undersurface of the head of the screw and prevent it from backing off.

Figure 10:
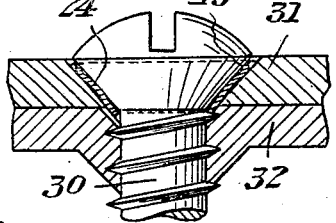
Fig. 10 shows the washer of Fig. 6 on a sheet metal screw which has been turned home.

Fig. 10 illustrates a further application of the washer 24 to a sheet metal screw 30 which serves to secure an outer sheet or strip 31 to an underlying sheet or member 32, the thickness of both the sheets 31 and 32 being somewhat exaggerated for the sake of clearness.

Figure 8:
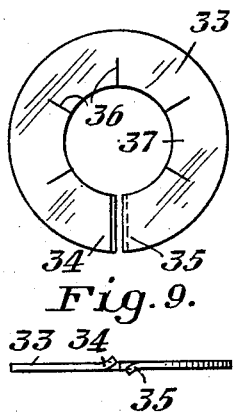
Fig. 8 is a plan view of a further modified form of washer.
Figure 9:
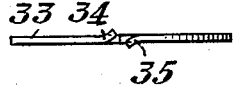
Fig. 9 is an edge view thereof.

Figs. 8 and 9 illustrate a further modification of the invention according to which a split lock washer 33 has its opposite ends 34 and 35 deformed in opposite directions. Radial slits 36 are spaced circumferentially of the hole in the washer as in the case of the washers 10 and 24. The washer 33 serves to lock a screw, bolt, or nut in the same manner as the ordinary spring-type of lock washer. It is adapted to be pre-assembled with a screw or bolt, however, by deforming the tongues 37 between the slits 36 in the manner already explained in connection with the washer 10.

It will be apparent from the foregoing description and explanation that the invention provides a lock washer having numerous advantages over such articles as have been known heretofore. In the first place, the washer may be permanently assembled with a threaded fastener by a mere press operation, after the completion of the manufacture of the latter, without any special tools or operations thereon. It is not necessary to apply a washer before turning the thread nor is it necessary that the shank of a fastener be recessed to hold the washer thereon. The lock washers may, therefore, be stamped from sheet metal and need not be made by bending a strip around a fastener shank and securing the ends thereof together. As indicated, furthermore, the washer is applicable to almost any type of threaded fastener, i. e., machine screw, cap screw, wood screw or bolt, and may be employed to lock either the threaded fastener or a nut cooperating therewith.

Although I have illustrated and described but a preferred embodiment with modifications, it will be understood that changes in the relation or conformation of various parts of the washer may be made without departing from the spirit of the invention or the scope of the appended claims.

I claim:

1. A permanently assembled fastener and a lock washer, the fastener having a head and a body portion, the body portion having threads, the washer comprising a disk having a central opening of less diameter than the body of the fastener, there being radial slits extending outwardly from the opening, whereby a plurality of spring tongues are formed surrounding the body of the fastener, the portion of the body of the fastener engaged by the spring tongues being substantially the same diameter as the adjacent portions of the body of the fastener, said tongues being sufficiently flexible to permit the body of the fastener to be pressed through the opening in the washer, so that the free ends of said tongues are sprung away from the head of the fastener, whereby the end edges of the tongues adjacent to the head of the fastener grip the body of the fastener and prevent withdrawal of the washer from the body of the fastener, and when applied one edge of each tongue grips the body of the fastener and the other grips the piece secured by the fastener.

2. A permanently assembled fastener and a lock washer, the fastener having a head and a body portion, the body portion having threads, the washer comprising a disk having a central opening of less diameter than the body of the fastener, there being radial slits extending outwardly from the opening, whereby a plurality of spring tongues are formed surrounding the body of the fastener, the portion of the body of the fastener engaged by the spring tongues being substantially the same diameter as the adjacent portions of the body of the fastener, said tongues being sufficiently flexible to permit the body of the fastener to be pressed through the opening in the washer, so that the free ends of said tongues are sprung away from the head of the fastener, whereby the end edges of the tongues adjacent to the head of the fastener grip the body of the fastener and prevent withdrawal of the washer from the body of the fastener, and when applied one edge of each tongue grips the body of the fastener and the other grips the piece secured by the fastener, and a plurality of teeth along the outer edge of the disk arranged to engage the underside of the head when the fastener is applied.

DAVID HOPPENSTAND.